United States Patent [19]

Ringwood

[11] Patent Number: 5,010,043

[45] Date of Patent: Apr. 23, 1991

[54] PRODUCTION OF DIAMOND COMPACTS CONSISTING ESSENTIALLY OF DIAMOND CRYSTALS BONDED BY SILICON CARBIDE

[75] Inventor: Alfred E. Ringwood, Redhill, Australia

[73] Assignee: The Australian National University, Australia

[21] Appl. No.: 283,362

[22] PCT Filed: Mar. 2, 1988

[86] PCT No.: PCT/AU88/00058

§ 371 Date: Nov. 15, 1988

§ 102(e) Date: Nov. 15, 1988

[87] PCT Pub. No.: WO88/07409

PCT Pub. Date: Oct. 6, 1988

[30] Foreign Application Priority Data

Mar. 23, 1987 [AU] Australia ............................... PI1024

[51] Int. Cl.$^5$ ..................... C04B 35/56; C04B 35/58; B24D 3/00
[52] U.S. Cl. ......................................... 501/90; 501/86; 501/88; 423/345; 423/439; 423/446; 51/307
[58] Field of Search ..................... 423/345, 439, 446; 501/88, 90, 86; 51/307, 308, 309

[56] References Cited

U.S. PATENT DOCUMENTS

| | | | |
|---|---|---|---|
| 3,574,580 | 4/1971 | Stromberg et al. | 51/307 |
| 4,124,401 | 11/1978 | Lee et al. | 501/90 |
| 4,142,869 | 3/1979 | Vereschagin et al. | 51/295 |
| 4,151,686 | 5/1979 | Lee et al. | 51/307 |
| 4,167,399 | 9/1979 | Lee et al. | 51/307 |
| 4,168,957 | 9/1979 | Lee et al. | 51/309 |
| 4,231,195 | 11/1980 | De Vries et al. | 51/308 |
| 4,241,135 | 12/1980 | Lee et al. | 51/308 |
| 4,259,090 | 3/1981 | Bovenkerk | 51/309 |
| 4,874,398 | 10/1989 | Ringwood | 51/309 |

FOREIGN PATENT DOCUMENTS

94147 11/1983 European Pat. Off. .

Primary Examiner—Mark L. Bell
Assistant Examiner—Anthony J. Green
Attorney, Agent, or Firm—Nixon & Vanderhye

[57] ABSTRACT

A process for producing a diamond compact comprised of diamond crystals bonded mainly by silicon carbide. The diamond crystals are intimately mixed with silicon in the proportions 97 to 65 percent by weight of diamond to 3 to 35 percent by weight of silicon. The thus-mixed diamond crystals and silicon are placed immediately adjacent to one or more bodies of silicon within a container and subjected to high pressure and temperature so as to cause melting of the premixed silicon and of the external silicon which infiltrates into the interstitial spaces between the diamond crystals to cause most of the silicon between the diamond crystals to react with diamond to produce silicon carbide. The elevated temperature is in the range 1,100° to 18,000° C., and the elevated pressure is in the range 10 to 40 kilobars. The resulting compact contains between 50 and 85 volume percent of diamond with a density of at least 3.35 g/cm$^3$ and a compressive strength of at least 10 kilobars.

19 Claims, 1 Drawing Sheet

PRODUCTION OF DIAMOND COMPACTS CONSISTING ESSENTIALLY OF DIAMOND CRYSTALS BONDED BY SILICON CARBIDE

TECHNICAL FIELD

This invention relates to an improved method of producing a diamond compact possessing sufficiently high degrees of abrasiveness, hardness and mechanical strength so as to permit the compact to be employed usefully in the cutting, machining, milling, drilling, grinding and working of ultra-hard materials. These ultrahard materials include advanced ceramics such as silicon carbide, boron carbide, silicon nitride, sialons, alumina, partially stabilized zirconia and beryllia, metallic materials such as tungsten carbide, titanium carbide, titanium boride and high temperature nickel and cobalt-based alloys, and very hard natural minerals and rocks such as semi-precious and precious gems, quartzite and banded iron formations.

Many different kinds of diamond compacts and diamond composites have been described in the literature and their properties vary widely. Generally speaking, a diamond compact is understood to mean a polycrystalline body possessing substantial abrasiveness and hardness and low or negligible porosity, comprised of more than 50 percent by volume of diamond crystals, in which a large amount of diamond to diamond contact occurs.

In one class of diamond compacts, which usually contains more than about 85 percent by volume of diamond crystals, the diamonds are joined at their contacts by diamond-to-diamond bonding. This means that the diamond crystalline structure is essentially continuous between adjacent diamond crystals and the strengths of the bonds between adjacent crystals are comparable with the strength of the carbon-to-carbon chemical bonds within single diamond crystals. These compacts possess very high hardness and compressive strengths because of their diamond-to-diamond bonding.

A second class of diamond compacts exists which are composed of more than 50 percent by volume of diamond and less than 50 percent by volume of non-diamond bonding materials. The diamonds are packed sufficiently closely so that a substantial or major proportion are in direct contact, which also causes these compacts to possess high compressive strengths. However, the diamonds themselves are only weakly bonded at their mutual contacts and the cohesion or tensile strength of the compact is provided mainly by bonding between the diamonds and the non-diamond bonding material. The difference between these two classes is readily revealed when the compact is leached with a solvent which selectively dissolves the non-diamond bond. If diamond-to-diamond bonding exists, the diamond crystals remain strongly bonded. However, if this kind of bonding is not present or only weakly developed, the individual diamonds can readily be separated, after dissolution of the bonding agent, using, for example, a steel needle or scalpel. The present invention relates to a diamond compact of this second class, in which the non-diamond bonding matrix is composed mainly of silicon carbide.

It will be appreciated by those skilled in the art that the qualities displayed by diamond compacts proposed in the literature vary over an extremely broad range, according to their compositions, structures, nature of their bonds and their pressures, temperatures and times of fabrication. Many compacts, particularly those produced at pressures below 10 kilobars, may display substantial abrasiveness, but are lacking in toughness and compressive strength. They may be useful for grinding and general abrasive purposes, but cannot be practically utilized in applications where a combination of high hardness with high toughness and compressive strength is required, for example, in drilling, turning, shaping and machining very hard ceramics, carbides, rocks and minerals. Diamond compacts in this category should possess compressive strengths of at least 10 kilobars and preferably greater than 20 kilobars. This invention relates to a compact in this latter category.

However, even though a diamond compact may possess considerable hardness, compressive strength and toughness, these attributes do not guarantee that the compact will have the capacity to work ultra-hard materials such as those specified above. The microstructure of the compact is also an important factor in determining whether it is effective in these applications. If diamond crystals are packed too closely together and the gaps between the crystals are too small, then the compact may not abrade and work the surfaces of ultrahard materials satisfactorily. A compact of this type may develop a small, smooth wear-flat after limited application to the work-piece. After the smooth wear-flat has developed, the compact may then slip and skid over the surface being worked, removing stock from the surface at a greatly reduced rate or failing entirely to remove further stock. In order to cut, grind, turn, drill and otherwise work the surfaces of ultrahard materials, the wear-flat which is developed on a diamond compact tool should not be smooth but instead should develop a significant degree of small-scale roughness provided by protruding edges and corners of individual diamond crystals. The establishment and maintenance of these abrasive cutting edged requires a certain finite separation between a substantial proportion of the adjacent edges of diamond particles. This separation may be provided by the bonding agent, which is softer than the diamond crystals, and therefore wears faster, thereby exposing the edges of microscopic diamond crystals so that they can attack the workpiece. Alternatively, it can be provided by the presence of a limited degree of open porosity or controlled microcracking in the compact, which produce a multitude of cutting edges at the microscopic scale and may cause the compact to be self-sharpening.

We have found that in order to cut, drill, grind, turn and otherwise work ultrahard materials at optimum rates, diamond compacts of the class in which the bonding agent is mainly silicon carbide should contain less than 85 percent by volume of diamond. Preferably, compacts of this class should contain less than 80 percent by volume of diamond crystals. However, in order to perform well, the compact should contain not less than 50 percent by volume of diamond particles. Below this limit, the proportion of diamond crystals in direct contact with one another falls rapidly and so the compacts display insufficient compressive strength and excessive brittleness. Preferably, compacts of this class should contain more than 65 volume percent of diamond particles.

Diamond compacts suitable for use as drilling bits, cutting tools, wire-drawing dies and related applications can be made by several techniques. One such technique (U.S. Pat. Nos. 4,151,686; 4,231,195 Tomlinson et al (1985) Ind. Diamond Rev. 45, 299-304) places a mass of polycrystalline diamond powder in juxtaposition with a mass of silicon or silicon-rich alloy. The diamond-silicon assembly is placed in a high pressure-high temperature apparatus and subjected to a pressure of about 55 kilobars. The diamond-silicon assembly is then heated to about 1200°-1500° C. whilst subjected to pressure. This causes the silicon or silicon-rich alloy to melt and to infiltrate the mass of diamond powder. The temperature and pressure are maintained for a sufficient time to cause most of the silicon to react with the diamond to form silicon carbide which provides a strong bond between the diamond crystals.

This impregnation technique is capable of producing compacts which possess great hardness and considerable toughness. These compacts are useful for drilling and working soft to medium-hard rocks such as shale, mudstone, sandstone, limestone and granite; relatively soft to medium hard ceramic materials, and some metallic alloys. They remove stock from the surfaces of materials by processes which can be described as shearing, gouging or ploughing. However compacts of this type may not be practically effective in working ultrahard ceramics, carbides, metals and rocks of the types specified above. After the development of small wear-flats, the tools may tend to slip and skid over the surface of the workpiece and fail to remove stock at practically useful rates. The reason for this behaviour is the high packing density of diamond particles, and the small separations between diamond particles which cause the wear-flats on these compacts to be excessively smooth. The stated objective in U.S. Pat. Nos. 4,151,686 and 4,231,195 is to maximize the packing density of diamond particles. This is achieved firstly by employing a range of diamond particle-sizes—small, medium and large—in proportions chosen to optimize packing density. Secondly, the mass of size-graded diamond particles is further compressed by subjecting it to very high pressures—typically about 55 kilobars. It is only when the packing density of the mass of diamond particles has thereby been maximized, that molten silicon or silicon alloy is injected into the mass of diamond crystals, where it reacts to produce a bond mainly of silicon carbide. Compacts produced according to the preferred conditions specified in U.S. Pat. No. 4,151,686 contain about 90 volume percent of diamond whilst those produced according to U.S. Pat. No. 4,231,195 contain 90 to 95 volume percent of diamond.

This impregnation technique possesses certain other disadvantages. When the mass of diamond powder is compressed prior to heating, extremely high local pressures are developed at the points of contact of individual diamond crystals causing extensive cracking of the crystals. Some of the fine cracks may not be subsequently impregnated by silicon and may accordingly weaken the compact and render it brittle. Moreover, the distance which molten silicon can fully infiltrate into the mass of diamond powder under these conditions is limited and it is not possible to product useful compacts by this technique with minimum dimensions (thicknesses) greater than about 5 mm.

A second method of producing a diamond compact is described in U.S. Pat. No. 3,239,321. In that method, diamonds are mixed with a matrix material, the mixture is subjected to an elevated pressure at which graphitization of diamond is inhibited, and the mixture then heated to cause the matrix to melt. The specification describes examples using a wide variety of matrix materials and generally involving operation in the diamond stability field at pressures of 50 to 76 kb. The specification does describe an experiment using silicon as the bonding agent at an elevated pressure of 45 kb. However, the products obtained in this manner were found to be relatively weak and of no practical value and the patent does not claim a process which employs silicon to provide the bonds.

In International Patent Application No. PCT/AU85/00201 (International Publication No. W086/01433), we have described a diamond compact and process for producing it which comprises subjecting a mixture of diamond crystals and silicon to pressures preferably in the range 15-30 kilobars and temperatures preferably in the range 1200°-1600° C. for at least 3 minutes and preferably 5 to 30 minutes. The mixture preferably contains between 5 and 20 weight percent of silicon. Pressure and temperature were applied in a sequence which causes extensive plastic deformation and minimal cracking of diamond crystals. The run times employed were sufficiently long so as to cause all or most of the silicon to react with diamond to form a silicon carbide bond. Thicknesses of compacts so produced were typically larger than 5 mm and as large as 10 mm whilst crushing strengths were typically higher than 20 kilobars and as high as 50 kilobars.

The full disclosure of our co-pending International patent application No. PCT/AU85/00201 is considered as incorporated in this specification by reference.

In a preferred performance of that invention, 90 percent by weight of diamond powder in the size range 10-60 microns was intimately mixed with 10 weight percent of finer (1-5 micron) silicon powder. The mixture was placed in a piston-cylinder high pressure, high temperature apparatus. The temperature of the sample was increased to a value between 1000° and 1200° C. which is below the melting point of silicon, and pressure was then increased to 30 kilobars over a period of a few minutes. This causes densification and consolidation of the mixture. At this stage, there is negligible reaction between diamond and silicon. The density of the diamond-silicon aggregate rises to about 3.30 g/cm$^3$ which is nearly as high as that of a fully dense mixture of diamond plus 10 percent silicon (3.34 g/cm$^3$). Densification is achieved via extensive plastic deformation and flow of diamond and silicon crystals. After this stage is reached, the diamonds form a rigid framework which tends to resist the transmission of pressure from the external surfaces. Temperature is then increased to a level exceeding the melting point of silicon, typically to around 1475° C., and held for 15-30 minutes. Molten silicon reacts with diamond crystals to form the silicon carbide bond. Because of the higher density of silicon carbide (3.22 g/cm$^3$) as compared to silicon 2.33 g/cm$^3$), the reaction proceeds with a decrease of volume, causing the development of a significant degree of porosity within the compact. Densities of compacts formed in the practice of this invention are typically about 3.30-3.34 g/cm$^3$ whereas the theoretical density of the equivalent fully dense mixture of diamond and silicon carbide is 3.47 g/cm$^3$. Most of this difference is caused by the presence of 2-4 percent of residual porosity. Ultrasonic studies show that an appreciable proportion of this is present in the form of small microcracks. Compacts prepared according to this particular formulation contain about 80-82 volume percent of diamond. Compacts prepared by this process often display an improved capacity to machine, grind and otherwise work very hard carbides, ceramics and rocks such as those mentioned previously. After a wear-flat is developed, they continue to cut and grind and remove stock at practically useful rates. This occurs mainly because of the presence of small but finite porosity combined with the system of microcracks which yields a wear-flat possessing an uneven surface and causes the compacts to be self-sharpening. Accordingly the compacts do not tend to glaze, but continually expose new and sharp cutting edges as they wear.

Although compacts produced by this process usually possess high strength and hardness, these properties tend to vary substantially from run to run, even when carried out under apparently identical conditions. This seems to be caused by the sensitivity of the microcrack systems to small amounts of chemical contaminants derived from the pressure cell which are difficult to control. Providing the microcracks do not intersect excessively, the compacts display excellent properties. However, if the degree of intersection of the interconnectedness of the microcracks exceeds a certain level, the strength and abrasiveness of the compacts are sharply diminished.

The present invention relates to an improvement in our co-pending International Patent Application which overcomes these problems and yields compacts possessing improved abrasiveness, toughness and compressive strength, higher density, and also a greater degree of reproducibility in these properties when the compacts are produced according to a standardized set of conditions.

DISCLOSURE OF THE INVENTION

According to this invention, there is provided a process for producing a diamond compact, comprised of diamond crystals bonded mainly by silicon carbide, comprising:

intimately mixing the diamond crystals in the proportions 97 to 65 percent by weight of diamond to 3 to 35 percent by weight of silicon;

placing the body of the thus mixed diamond crystals immediately adjacent to one or more bodies of silicon; and subjecting the thus mixed diamond crystals and the body or bodies of silicon to a temperature above the melting point of silicon in the range 1100° to 1800° C. and to pressure in the range 10 to 40 kilobars so as to cause melting of the premixed silicon and said body or bodies of silicon and infiltration of silicon from said body or bodies into the interstitial spaces between the diamond crystals and to cause most of the silicon between the diamond crystals to react with diamond to produce silicon carbide, said silicon carbide, forming a bond between diamond crystals, the overall proportions of diamond and silicon being such as to produce a compact containing between 50 and 85 volume percent of diamond with a density of at least 3.35 g/cm$^3$ and a compressive strength of at least 10 kilobars.

The intimate mixing of the diamond crystals with silicon may be carried out by mechanically mixing the diamond crystals with silicon particles and/or by coating the diamond crystals with films of silicon at least 0.2 microns thick.

Preferably the pressure and temperature are applied in a sequence and over sufficient time to cause substantial plastic deformation of the diamond crystals.

Preferably further, the elevated temperature and pressure are maintained for at least about 3 minutes.

There may be a pair of said bodies of silicon between which the diamond crystals mixed with silicon are placed before application of the elevated pressure and temperature conditions.

The invention also extends to a diamond compact when formed by the process described above.

More specifically, the invention extends to a diamond compact comprised of 50–85 volume percent of diamond crystals bonded together by an interstitial bonding material dispursed throughout the diamond crystals and comprised mainly of silicon carbide, said compact having a density of at least 3.35 g/cm$^3$ and a compressive strength of at least 10 kilobars.

In the practice of the present invention, the early stages of the reaction between premixed diamond and silicon particles proceed similarly as described in International patent application No. PCT/AU85/00201. However, whereas in that process, the reaction of silicon and diamond to form silicon carbide proceeds with a volume contraction, thereby producing substantial porosity and microcracking within the compact, in the present invention, the external body(s) of molten silicon is continuously injected into the compact during this contraction, thereby eliminating most of the porosity and microcracking, and increasing the density typically to 3.35–3.42 g/cm$^3$.

The injection of additional silicon into the compact during reaction causes an increase in the total amount of silicon in the compact. For example, whereas the initial mixture of diamond and silicon may contain 10 weight percent of silicon, the final compact would typically contain about 18 weight percent of silicon. According to the practice of this invention, more than half of the total silicon is present as silicon carbide. Preferably more than 80 percent of the silicon is present as silicon carbide and still more preferably, more than 90 percent of the silicon is present as a silicon carbide bonding agent. Compacts formed according to the practice of this invention contain less than 85 volume percent and greater than 50 volume percent of diamond. Preferably, they contain less than 80 volume percent and more than 65 volume percent of diamond. There is substantial flexibility in the proportions of silicon which are premixed and the proportions of silicon which are injected, in order to produce compacts containing the overall proportions of diamond specified in this invention The proportion of premixed silicon may vary between 3 and 25 weight percent. The amount of additional silicon which is injected into the compact from the external reservoir is influenced by the size distribution of the diamonds and other factors, but typically varies between 5 and 15 percent of the final weight of the compact.

Compacts formed according to the present invention display a substantially improved capacity to work ultrahard materials as compared to the compacts produced according to IPA No. PCT/AU85/00201, as shown by examples described later in this application. The compacts of IPA No. PCT/AU85/00201 remove stock from the surfaces of hard materials through cutting edges whose sharpness is produced primarily by the microcrack system. The present compacts are denser (3.35–3.42 g/cm$^3$) than the earlier IPA compacts (3.30–3.34 g/cm$^3$) and possess comparatively few microcracks, as shown by their low attenuation of ultrasonic waves. When applied to hard and ultrahard materials, the silicon carbide bond is worn down preferentially to the diamonds, the edges of which protrude above the silicon carbide. The protruding diamond edges continue to cut, grind and remove stock from ultrahard materials even after substantial wear flats have been established. In order to behave in this manner, the compacts should possess proportions of diamond and bonding agent (silicon carbide-silicon) within the limits defined above. If the proportion of bonding agent(s) are too small, and the diamonds are packed too closely together, the wear-flats are relatively smooth, causing the compacts to be less effective in removing stock at practically useful rates. It is primarily for this reason that compacts made solely by impregnation of compresses diamond powder by molten silicon, as described in U.S. Pat. No. 4,151,686 are substantially less effective in working ultrahard materials than the compacts described in the present application.

The properties of compacts produced by the present combined pre-mixing-impregnation method are highly reproducible and the success rate in producing compacts possessing industrially useful abrasive properties usually exceeds 90 percent. In contrast, it is substantially more difficult to obtain uniform properties in compacts made by premixing alone as in IPA No. PCT/AU85/00201 because of problems in controlling the degree of intersection of their microcrack systems.

The present invention produces much larger compacts than can be produced using infiltration methods alone, as described in U.S. Pat. 4,151,686 and in the commercial product marketed as "SYNDAX-3" and described by Tomlinson et al, (1985) Industrial Diamond Review 45, 299-310. For example, compacts have been produced in the form of cylinders with diameters of 13 mm and height (thickness) of 13 mm, whereas the maximum thickness of compacts produced by infiltration processes is about 5 mm. It should be possible to produce compacts with minimum dimensions greater than 13 mm using the procedures of the present invention. The limit is imposed by the size of the high pressure-high temperature apparatus which is currently employed. It is expected that larger compacts could be produced by using a suitable apparatus possessing larger capacity.

The premixing of silicon with diamonds, or the coating of diamonds by silicon also facilitates the infiltration of silicon from the external layer(s) into the interior. The melted silicon within the compacts wets the surfaces of diamond crystals and establishes a continuous capillary system between the diamond-silicon mixture and the external silicon. This enables external molten silicon to be infiltrated longer distances into the compact than are possible when compacts are formed solely by infiltration as in U.S. Pat. No. 4,151,686, thereby facilitating the fabrication of larger compacts which are commercially advantageous. Infiltration may be significantly more effective, and proceed for longer distances, when the diamonds are pre-coated by silicon rather than pre-mixed with an equivalent weight of silicon powder.

The larger size of the compacts produced according to the present invention confers important commercial and practical advantages when compacts are placed in tools for drilling rock and related purposes. For example, they have correspondingly longer lifetimes before requiring replacement. This is particularly advantageous when the compacts are used in rock drilling. Moreover, it is much less costly to set a single large diamond compact in a working tool than the equivalent weight of smaller compacts. The use of larger integral composites also extends the range of applications when incorporated in tools and drill-bits.

A further advantage of the present invention is that the diamonds are less crushed and fractured than those in compacts produced by infiltration processes alone. In the latter processes, full confining pressure is applied to the mass of diamond particles whilst they are cold and unsupported. This causes the local pressures at the points of contact of individual diamond to be greatly intensified, leading to extensive crushing and fracturing of the particles. However, when the diamonds are pre-mixed with silicon powder, which is more easily deformable than diamond, the silicon powder provides support for the diamonds during compression, the reduces the intense pressures which are generated at point contacts between diamond crystals. A similar advantageous effect is provided when the diamond crystals have been previously coated with films of silicon, for example, by plasma sputtering or by chemical vapour deposition. Moreover, according to a preferred means of performing the present invention, the mixture of diamond and silicon powder is heated to 1000°–1200° C. before application of full pressure. The subsequent application of full pressure causes extensive plastic deformation of the diamonds and silicon and densification, without substantial crushing and fracturing.

More generally, the combination of premixing and impregnation of silicon employed in the present invention provides much greater flexibility in the production and control of microstructures needed to produce compacts capable of working ultrahard materials, as compared to compacts produced by impregnation alone. Likewise, the combination of premixing and impregnation of silicon produces compacts having superior properties to those produced by premixing alone, as demonstrated in the examples described later in this application.

According to the present invention, solid particulate silicon is intimately mixed with the mass of diamond crystals prior to exposure to high pressures and temperatures. The relative proportions in weight percent of silicon (S) and diamond (D) vary between the composition $D_{65}S_{35}$ and $D_{97}S_3$. Intimate mixing of diamonds and silicon can be conveniently performed in a commercially available vibratory ball mill. In order to ensure goods mixing, the particle size of the silicon is preferably smaller than 50 microns and still more preferably smaller than 10 microns. However, the particle size of the silicon should preferably be not much smaller than 0.1 microns. Powders finer than this are covered by proportionally larger oxide films which may be deleterious.

An alternative method of obtaining the intimate mixture of bonding agent and diamond crystals is to apply a substantially uniform coating of silicon to the surfaces of the diamond crystals, for example, by chemical vapour deposition or by argon plasma sputtering. The proportions by weight of the coatings of silicon to the mass of diamonds remain generally within the limits specified above for powder mixtures of diamond and silicon. However, the use of silicon films may also permit a smaller proportion of silicon to be initially incorporated into the diamond-silicon mixture than when silicon is pre-mixed as a powder. This occurs because silicon films are often vitreous and therefore less dense than silicon powder. Moreover, because essentially all of the surfaces of diamond crystals are pre-coated by silicon which wets the diamond surfaces when melted, the subsequent infiltration and capillary invasion of silicon from the external source(s) into the diamond aggregate is achieved more efficiently, and through greater distances. Thus, compacts possessing excellent mechanical properties and minimum dimensions greater than 5 mm have been prepared by infiltration of silicon into an aggregate of diamond crystals which had previously been coated with films of vitreous silicon about 0.2 microns thick.

The particle size of the diamond powder is preferably in the range 1–1000 microns and more preferably in the range 5–200 microns. Still more preferably, the diamonds are in a range of sizes from 5 to 100 microns, with the size distribution chosen so as to improve the efficiency of packing. Diamonds smaller than 1 micron can be used, but have been found to be more likely to experience graphitization. It is advantageous in the performance of this invention to ensure that the surfaces of the diamonds and the bonding material are clean, and free from oxidized surface films and other contaminants. This can be achieved by separately heating the diamonds and silicon in an atmosphere of hydrogen at temperatures of 600°–800° C. prior to fabrication.

BEST MODES OF CARRYING OUT THE INVENTION

Figure 1:
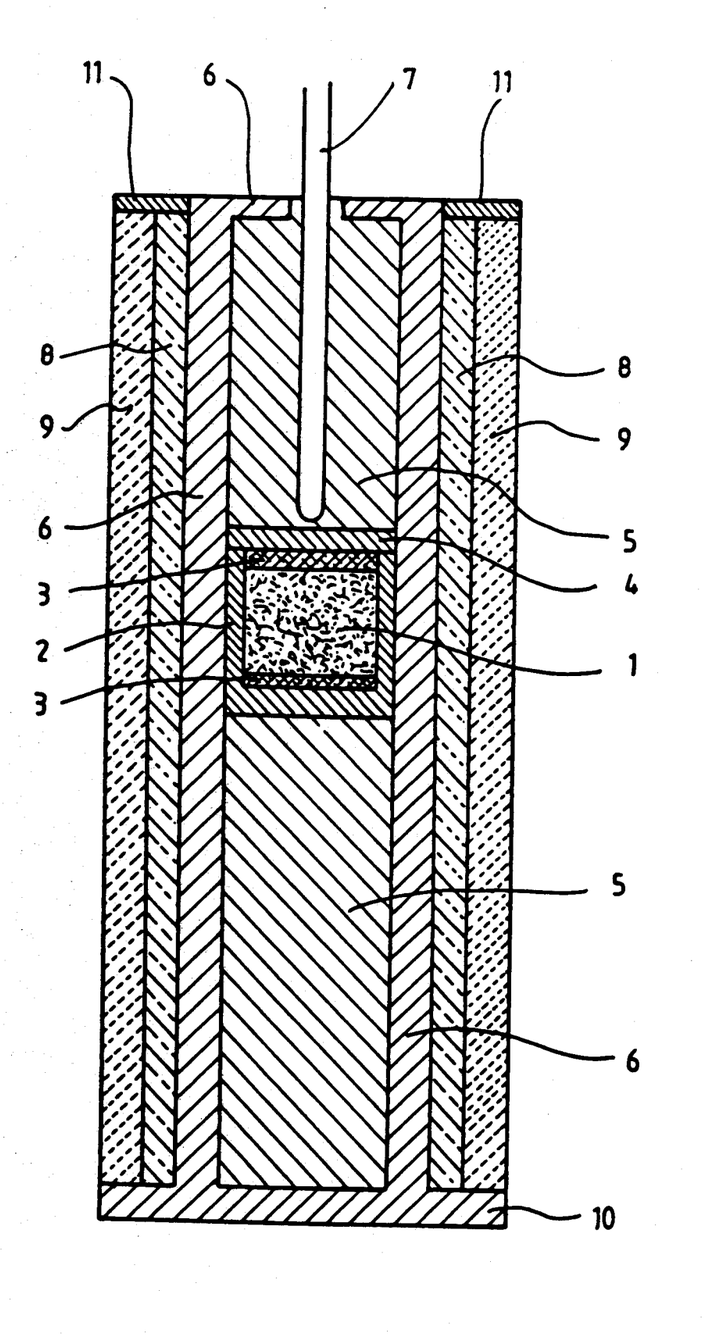
The accompanying drawing illustrates a pressure cell suitable for use in a high temperature-high pressure piston-cylinder apparatus for performance of the present invention.

In the performance of this invention, a container consisting of an inert and deformable material is used to hold the diamond silicon mixture. Preferably the container is made of hexagonal boron nitride. A convenient configuration is a hollow cylinder. A layer of silicon, either as powder or as a solid disc is placed on the floor. The mixture of diamond and silicon or of silicon-coated diamond is then placed in the cylindrical container of boron nitride on top of the silicon and tamped down. A second layer of silicon (as powder or as a solid disc) is then placed on top of the diamond-silicon mixture and the container is closed with a lid of boron nitride. The thicknesses of silicon layers or discs are typically about 1/20–⅓ of the height of the diamond-silicon mixtures. This configuration is not unique. Alternately, the layer of silicon can be placed adjacent to the diamond-silicon mixture around its cylindrical periphery, or as a rod along its axis. Other configurations can readily be envisaged and utilized by those skilled in the art. For example, it may sometimes be advantageous to place the external body of silicon at one end of the diamond-silicon mixture only, so that impregnation of external silicon into the compact proceeds in a single direction. The container is then placed in a pressure cell as illustrated in the drawing and subjected to the desired high pressures and temperatures in a high temperature-high pressure apparatus, which apparatus may be of the type described by F. Boyd and J. England (J. Geophys. Res, 65, 741, 1960).

The drawing shows a mixture of diamond and silicon 1 placed in a hollow cylindrical boron nitride container 2 between two layers of silicon. The container 2 is closed by a boron nitride lid 4.

Container 2 is placed between fixed pyrophyllite inserts 5 within a tubular graphite furnace 6 which can be heated to the desired temperature by a heavy electrical current. The temperature is monitored by a thermocouple 7.

Furnace 6 is disposed within a pyrex glass sleeve 8 and an outer talc sleeve 9 which extend between a graphite flange 10 on one end of the graphite furnace and an annular magnesia disc 11 at the other end of the furnace to serve as the pressure medium for the pressure cell.

Preferably, the amount of external silicon which is employed should be such that excess silicon remains on the surface of the compact after completion of the high pressure-temperature treatment. This excess silicon can be removed from the surface of the compact after fabrication by dissolution in a mixture of concentrated hydrofluoric and nitric acids.

Pressure is an important variable in carrying out the present invention. Providing other variables are kept constant, within the preferred set of conditions defined previously, the mechanical strength, abrasiveness and density of the compacts increases significantly as the mean confining pressure within the apparatus increases from 5 to 10 kilobars. At 5 kilobars, densities of 3.21 and 3.23 g/cm$^3$ were obtained in two separate runs, whilst at 10 kilobars, densities of 3.28 and 3.31 g/cm$^3$ were obtained in separate runs. Density often provides a useful guide to the abrasiveness and strength of compacts formed according to the practice of this invention. Compacts formed at operating pressures exceeding about 10 kilobars usually display strengths exceeding 10 kilobars. A further improvement in strength and abrasiveness occurs as pressure is increased from 10 to 15 kilobars. Densities of 3.35 g/cm$^3$ are typically produced at 15 kilobars whilst the strengths of compacts produced at 15 kilobars usually exceed 20 kilobars. As confining pressure increases from 15 through 20 to 30 kilobars, there is sometimes a significant improvement in mechanical and abrasive properties, but there is little improvement in mechanical strength and abrasiveness as pressure is increased from 30 kilobars to 60 kilobars. In view of these factors, the optimum pressure used to produce compacts is between 15 and 30 kilobars.

An important advantage of performing the invention at pressures below 40 kilobars is that it permits the use of relatively simple apparatus possessing much larger working volumes than the apparatus which is necessary if much higher pressures, in the region of 50 kilobars, are to be attained. In the latter case, it is necessary to use apparatus such as that described in U.S. Pat. No. 2,941,248 (Hall) in which the pressure vessel and pistons are constructed of tungsten carbide and possess a complex geometry which severely restricts the size of the working volume. On the other hand, if the pressures necessary to produce good quality compacts are less than 40 kilobars, the apparatus used can possess a very simple geometry such as a straight piston which compresses the pressure medium axially within a straight cylinder. This kind of apparatus can readily be scaled up to yield a large working volume. Moreover, the pressure vessel can be constructed entirely of steel, which is much cheaper than tungsten carbide. Because of these factors, compacts having substantial compressive strengths can be produced below 40 kilobars at much lower costs than in the more complex apparatus necessary for higher pressures. An important advantage of this invention is its capability of producing mechanically strong compacts capable of working ultrahard materials using a piston-cylinder high pressure apparatus. However the present invention is not limited to this apparatus and can be performed in other kinds of apparatus at higher pressures with a practicable upper limit of about 60 kilobars.

Temperature is an important variable in the performance of this invention. Preferably, the mixed diamonds and silicon crystals are plastically deformed and densified at a temperature below the melting point of the silicon (which is about 1200°–1400° C., depending upon pressure). This is conveniently achieved by heating the diamond-silicon mixture in the solid state to an elevated temperature between 800°–1200° C. at low pressure and then increasing the pressure to its maximum level over a period of a few minutes. Temperature is then raised above the melting point of silicon to the desired level and maintained approximately constant until most of the silicon has reacted with diamond to form silicon carbide. The temperature range over which this is best achieved lies between 1300°–1600° C., with values of 1450°–1550° C. being preferred. Compacts possessing good properties can be made at higher temperatures, up to and exceeding 1800° C., with short run times of 3–5 minutes. However, the success rate in producing good quality compacts falls at these higher temperatures, apparently owing to partial graphitisation of diamond. Preferably, the amount of graphite in a compact is less than 2 percent, and still more preferably, less than 1 percent. These conditions are best achieved between 1450°–1550° C. Reaction times must be short at 1800° C. to achieve these limits. The practical upper temperature level for performance of the invention is about 1800° C. and the practical lower temperature is about 1250° C.

A simpler pressure-temperature cycle can also be used wherein full pressure is applied first and then temperature is increased to the operating value. Providing that the increase of temperature is performed sufficiently slowly, for example, over several minutes, substantial plastic deformation and densification of the diamond-silicon mixture can be produced prior to melting of the silicon. This cycle tends to fracture a larger proportion of diamonds than the previously described cycle. However, because of the support provided by admixed or coated silicon, it causes a much smaller degree of fracturing and crushing of diamonds than the impregnation process described in U.S. Pat. No. 4,151,686.

Reaction times used in the performance of this invention are determined by the objective of obtaining a desired degree of plastic deformation of diamonds, a substantial or essentially complete degree of chemical reaction between the diamonds and the bond, and minimum formation of free graphite. Reaction times preferably range from 3 to 60 minutes, with periods of 5 to 30 minutes being most commonly employed. Periods less than 3 minutes are generally unsatisfactory because they do not produce a sufficient degree of reaction between silicon and diamond to form the silicon carbide bond. Reaction periods longer than 60 minutes do not usually lead to substantially improved properties in the compact. Optimum reaction times are dependent upon run temperature. Periods of 30–60 minutes may be desirable when compacts are produced at 1250°–1400° C. Between 1400°–1600° C., preferred reaction times are 10 to 30 minutes.

A further objective of the present invention is to produce a substantial degree of plastic deformation of a large proportion of the diamond component, thereby providing diamond-to-diamond contacts in two dimensions, along complementary curviplanar surfaces, rather than at points and edges. In some cases, thin films of silicon carbide may form between such closely adjacent crystals. This structure provides greater compressive strength and rigidity in the resultant compacts. A further advantage is that plastically deformed diamond is harder than undeformed diamond. The desired degree of plastic deformation among the diamond crystals is achieved by careful control of the times and sequence over which pressure and temperature are applied during fabrication of the compacts, as described previously.

We have found that the addition of a small proportion of certain metals to the silicon which is mixed with the diamond and/or the adjacent mass of silicon, prior to the hot-pressing steps, may yield a compact possessing improved properties, e.g. abrasiveness and electrical conductivity. Moreover, the addition of these metals may improve the ability of the silicon to wet the diamonds and to infiltrate the mass of diamonds.

The quantity of metal additive used in this embodiment amounts to a minor proportion of the total silicon when measured as an atomic percentage. Specifically, the amount of metal additive is smaller than 30 atomic percent of the total silicon present. Metals which may provide advantageous properties when used in this way are selected from two groups. The first group comprises metals which react with carbon to form stable carbides having melting points exceeding 1600° C. and include titanium, zirconium, hafnium, niobium, tantalum, tungsten, molybdenum, vanadium, uranium, thorium, scandium and beryllium. The second group comprises metals which do not form stable carbides but which bond strongly to diamond at high temperatures and do not melt in the presence of diamond at temperatures below 1600° C. Metals in this second group include rhenium, rhodium, ruthenium, iridium, osmium and platinum.

When compacts are prepared using minor proportions of one of more of the above metals, the latter are found to react with silicon or carbon to form small particles of electrically conductive carbides or silicides which are dispersed throughout the silicon carbide which continues to provide the primary bonding agent for the diamond crystals. Moreover, a small amount of some of these metals may become incorporated in the silicon carbide crystal lattice, thereby increasing the electrical conductivity of the silicon carbide bond. The metal additives may be intimately mixed with the silicon in a particulate form as the element, silicide or carbide, or alternatively, may be alloyed with the adjacent mass of silicon.

Titanium has been found to be especially advantageous as an additive when used in this way. A compact was prepared in the normal manner in which 15 atomic percent of the silicon was replaced by titanium. The compact was found to possess an electrical resistivity less than half of that displayed by normal metal-free compacts. This property greatly facilitated its shaping by spark machining (EDM) methods which was highly advantageous. The titanium additive was also found to improve the wetting of the diamond by the silicon and the infiltration of the silicon through the mass of diamonds. When rhenium was employed as an additive to the extent of 10 atomic percent of rhenium to 90 atomic percent of silicon, the abrasive properties of the resultant compact were substantially improved.

Diamond compacts produced according to the preferred conditions may display several desirable characteristics. Their hardness and abrasiveness are typically higher than tungsten carbide whilst their compressive strengths may be similar to that of tungsten carbide. Compressive strengths of 50 kilobars have been measured. They are essentially isotropic in their macroscopic physical properties, unlike natural diamonds which are highly anistropic.

Compacts produced according to the present invention possess important practical and commercial advantages over compacts produced solely by impregnation techniques as described in U.S. Pat. No. 4,151,686. They usually display a superior capacity to machine, cut, grind, drill and otherwise work ultrahard materials such as tungsten carbide, silicon carbide, boron carbide, zirconia, alumina, beryllia, sialon, silicon nitride, quartzite, sapphire and other diamonds, whilst their abrasiveness against soft to medium-hard rocks such as mudstone, shale, sandstone, limestone, schist, gneiss, basalt, greenstones and granite may be comparable to those of compacts produced solely by impregnation. The fact that compacts described in the present invention can be produced with larger physical dimensions gives them practical advantages when used in drilling rocks. A further practical advantage of the present compacts is that they usually display sufficiently high electrical conductivity to permit them to be fabricated and shaped by spark erosion techniques. The electrical conductivity is believed to arise from lattice defects produced by plastic deformation of the diamonds. In contrast, commercial compacts such as SYNDAX-3 which are produced solely by impregnation usually possess much lower electrical conductivities and cannot be shaped by spark erosion techniques.

Compacts produced according to the present invention also possess important practical advantages over compacts produced by pre-mixing of diamond and silicon as described in our co-pending International patent application No. PCT/AU85/00201. They possess significantly higher densities and less pore space and microcracking as shown by their low attenuation or ultrasonic P and S waves. They are substantially superior in their capacity to machine, cut, drill and work ultrahard materials such as those specified above. Moreover, they are considerably superior in their capacity to machine, cut, drill and work a wide range of common rocks. They also display a greater reproducibility and uniformity of physical properties when produced by standardized procedures.

The production and properties of diamond compacts according to the present invention is described in the following examples and it is to be understood that these are not to be considered as limiting the scope of the invention in any way. In some of these examples, standardized wear tests were carried out to measure and compare the performances of different compacts. In one test, cylinders of the workpiece (e.g. K68 tungsten carbide, partially stabilized zirconia, alumina, silicon carbide, boron carbide) from 20 to 25 mm in diameter were rotated in a lathe at 600 rpm and the fixed edge of the compact was set to make traversing cuts of 0.1 or 0.05 mm in depth. After a number of cuts, typically 50–100, the volume removed from the workpiece cylinder and the volume of the compact removed during turning were measured. The "wear coefficient" for a compact against a particular workpiece material was taken as the ratio of the volumes of workpiece material removed to the volume of diamond compact removed. Analogous tests were carried out on cylinder of Moruya granite and Heavitree quartzite except that these cylinders were 30–35 mm in diameter.

EXAMPLE 1

A mixture comprising 80 percent of 40–60 micron diamond powder and 20 percent of 4–8 micron diamond powder was prepared. This mixture was further intimately mixed with 1–5 micron silicon powder in proportions by weight comprising 90 percent diamond to 10 percent of silicon. A cylindrical container of boron nitride with internal diameter of 12 mm and an internal height of 15.5 mm was prepared. A solid disc of silicon 0.5 mm thick with a diameter of 12 mm was placed across the base of the container. The diamond-silicon mixture was then tamped into the container on top of the silicon disc. Finally, a second disc of silicon 1.0 mm thick was placed over the diamond-silicon mixture and the container closed with a disc of boron nitride. The resulting capsule was then placed in a pressure cell of the kind illustrated and described herein and subjected to high temperature and pressure in a piston cylinder apparatus of the type described by F. Boyd and J. England (J. Geophys. Res. 65, 741, 1960).

A pressure of 2 kilobars was first applied to consolidate the components of the pressure cell. The temperature of the diamond-silicon mixture was then increased to 1100° C. over a period of 5 minutes. This temperature was insufficient to melt the silicon or to cause appreciable graphitization of the diamonds. Pressure within the apparatus was then increased to 30 kilobars over a period of 5 minutes. After holding the temperature at 1100° C. for a further 5 minutes, temperature was increased to 1550° C. over a period of 2 minutes and held constant for 25 minutes.

After completion of the run, temperature and pressure were slowly reduced to ambient conditions over a period of 30 minutes. The sample capsule was then removed from the apparatus.

The powder mixture was found to have formed into a diamond compact which was recovered in the form of an intact cylinder. After removal of excess silicon adhering to the compact by dissolution in a mixture of concentrated nitric and hydrofluoric acids, the cylindrical compact was found to possess a diameter of 11.5 mm, a height of 10.5 mm and a density of 3.40 g/cm$^3$. The compact possessed excellent strength and hardness. When broken, the fractures were found to extend through the diamond crystals, showing the strength of the diamond-silicon carbide bond. X-ray diffraction analysis and measurements of polished surfaces showed that the compact consisted of diamond and silicon carbide, with minor silicon and graphite. The graphite content was less than 1 percent, and the silicon content was about 2 percent. The amount of excess silicon which had been impregnated into the compact was determined gravimetrically as 8% by weight. Thus the compact contained 18% of total silicon most of which was contained in silicon carbide which amounted to 23% by weight. These figures imply that the compact contained about 73 percent of diamond by volume, a figure which was confirmed by measurements of the surface area of diamond in a photograph of a polished surface.

Shaped pieces were cut from the compact by spark erosion and mounted in tools. They were found to readily turn and drill ultrahard ceramics and carbides including K68 tungsten carbide, alumina, partially stabilized zirconia, sialon, silicon carbide, boron carbide, and rocks such as quartzite and granite. The results of a set of standardized wear tests on different materials are given in Table 1 where they are compared with the corresponding performance of compacts produced by the method described in Example 1 of International Patent Application No. PCT/AU85/00201. It is seen that compacts prepared according to the present invention display a considerably improved capacity to turn ultrahard ceramics and carbides as compared to the compact of PCT/AU85/00201 and are also greatly superior in turning a common medium-hard rock such as granite.

TABLE 1

Comparison of wear coefficients for diamond compacts made according to the present process and the process described in International Patent Application No. PCT/AU85/00201 for different materials

| Material | Wear Coefficient* | |
|---|---|---|
| | Present process | PCT/AU85/00201 |
| K68 tungsten carbide | 10,000–30,000 | 270–500 |
| Partially stabilized zirconia | 167,000 | 3,000–7,000 |
| Alumina (97% dense) | 109,000 | 10,000 |
| Heavitree quartzite | 95,000 | 13,000 |
| Moruya granite | 200,000–800,000 | 20,000–50,000 |

*Ratio of volume by stock removed to volume of tool removed by wear, once the cutting performance has stabilized (see text).

A similar series of tests were carried out using two samples of SYNDAX-3, a silicon carbide bonded diamond compact tool described by Tomlinson et al., *Industrial Diamond Review* 6, 299 (1985) and in commercial presentations by De Beers. SYNDAX-3 is understood to be produced by the impregnation method at about 55 kb, 1500° C., essentially according to the process of U.S. Pat. No. 4,151,686 except that the diamond particle size is between 15–30 microns. Because of the less efficient volumetric packing of the diamond particles, SYNDAX-3 contains 82 volume percent of diamond, somewhat less than the diamond compact of U.S. Pat. No. 4,151,686. The samples were obtained from different production batches.

In the standard turning tests described above, one of the SYNDAX-3 tools was unable to remove significant amounts of stock from K68 tungsten carbide, partially stabilized zirconia and quartzite. The tools slipped and skidded over the workpieces. The second tool was unable to remove stock from tungsten carbide. However it was effective against partially stabilized zirconia and quartzite. Nevertheless, its overall performance against a range of ultrahard materials and granite was substantially inferior to the compact of the present invention as shown by the data in Table 2.

TABLE 2

Comparison of wear coefficients for diamond compacts made according to the present process with those of two samples of De Beers SYNDAX-3

| Material | Wear Coefficient | | |
|---|---|---|---|
| | Present process | SYNDAX-3* (a) | SYNDAX-3* (b) |
| K-68 tungsten carbide | 10,000–30,000 | Zero+ | Zero |
| Partially stabilized zirconia | 167,000 | Zero | 22,000 |
| Boron carbide | 200–350 | — | 88 |
| Silicon carbide | 1390 | — | 560 |
| Alumina (97% dense) | 109,000 | — | 83,000 |
| Heavitree quartzite | 95,000 | Zero | 38,000 |
| Moruya granite | 200,000–800,000 | 200,000 | >200,000 |

*2 samples of commercially produced SYNDAX-3 obtained from different production batches at different times.
+ Zero signifies that after removing a small amount of stock and developing wear flats, the tool then ceased to remove any significant amount of stock.

EXAMPLE 2

As for Example 1, except that a layer of 40–60 micron sized silicon carbide powder 2 mm deep was placed on the base of the boron nitride capsule instead of the silicon disc. The thickness of silicon discs at the top was increased to 1.5 mm. Silicon impregnation was therefore unidirectional and the bottom layer of silicon carbide served as a sink for excess silicon. The run was carried out as in Example 1, except that the pressure was 25 kb. After the run, the excess silicon carbide end was removed by spark erosion. The resultant diamond compact was 9 mm high and had a diameter of 11 mm. It possessed a density of 3.41 g/cm$^3$ and contained 76 volume percent of diamond. It displayed similar strength and abrasive properties to Example 1.

EXAMPLE 3

As for Example 1, except that the pressure used was 20 kb. The density of the resultant compact was 3.39 g/cm$^3$ and it contained 70 volume percent of diamond. Its strength and abrasive properties were generally similar to that of Example 1.

EXAMPLE 4

The pressure vessel used in this example possessed an internal diameter of 1.59 cm and the boron nitride container possessed an internal diameter of 6.6 mm and an internal height of 8.2 mm. Layers of silicon powder 0.5 to 0.75 mm thick were placed above and below the diamond-silicon mixture which was identical to that used in Example 1. The fabrication conditions were identical to those of Example 1.

The diamond compact was recovered as an intact cylinder with a diameter of 6.2 mm, a height of 5.2 mm and a density of 3.42 g/cm$^3$. Its acoustic P wave velocity was measured by ultrasonic interferometry and was found to be 16.8 km/sec with low attentuation. This may be compared with the P wave velocities of compacts formed by pre-mixing alone according to IPA No. PCT/AU85/00201 which are found to be about 13.5–14.8 km/sec and which also display high attenuation due to the presence of microcracks. The S wave velocity was 10.2 km/sec with very low attenuation as compared to 8.3 to 9.5 km/sec for IPA. No. PCT/AU85/00201 compacts. The latter also display very high attenuation and some do not transmit S waves because of the high density of microcracks.

EXAMPLE 5

The compact was prepared similarly to that of Example 4, except that the pressure used was 15 kilobars. The compact possessed a density of 3.36 g/cm$^3$ and had generally similar abrasive properties to the case of Example 1.

EXAMPLE 6

The compact was prepared similarly to that of Example 4, except that the pressure used was 10 kilobars. The compact possessed a density of 3.28 g/cm$^3$ and possessed substantially lower wear resistance and strength as compared with the previous examples. Nevertheless, it was capable of removing stock during turning tests on granite and tungsten carbide at commercially significant rates. X-ray analysis showed that the compact possessed a substantial amount of (5–10%) of unreacted silicon.

EXAMPLE 7

As for Example 4 except that the pressure used was 5 kb. The sample had a density of 3.21 gms/cm$^3$ and possessed low strength and poor abrasive properties.

EXAMPLE 8a,b,c,d,e

As for Example 4 except that the run temperatures were (a) 1400° C. for 60 minutes, (b) 1450° C. for 60 minutes, (c) 1500° C. for 30 minutes, (d) 1550° C. for 20 minutes, (e) 1600° C. for 10 minutes, (f) 1650° C. for 10 minutes (g) 1700° C. for 5 minutes, (h) 1750° C. for 5 minutes and (i) 1800° C. for 5 minutes.

Samples were recovered as intact cylinders with dimensions similar to Example 4. Densities of samples a, b, c, d, e and f varied from 3.37–3.40 g/cm$^3$ and they possessed generally similar abrasive characteristics to Example 1. Densities of samples g, h and i were between 3.36 and 3.31 g/cm$^3$ and were significantly less abrasive.

EXAMPLE 9

A mixture comprising 80 percent of 40–60 micron diamond powder and 20 percent of 20–40 micron diamond powder was prepared. This mixture was further intimately mixed with 1–5 micron silicon powder in proportions by weight comprising 90 percent diamond and 10 percent silicon. A cylindrical container of boron nitride with internal diameter of 12 mm and an internal height of 14 mm was prepared. The container possessed a cylindrical rod of boron nitride 3 mm in diameter along its central axis. An annulus of solid silicon 0.5 mm thick was placed across the bottom of the container. The diamond-silicon mixture was then tamped into the container on top of the silicon layer. Finally a disc of silicon 1.0 mm thick was placed over the diamond-silicon mixture and the container closed with a disc of boron nitride. The capsule was then subjected to the same high pressure, high temperature treatment as was described in Example 1.

After removal from the apparatus, the sample was found to have formed into a diamond compact which was recovered in the form of an intact cylinder containing the included rod of boron nitride along its axis. After dissolution of excess silicon adhering to the sample and removal of the axial boron nitride rod, the compact was found to possess a diameter of 10.5 mm, a height of 10.2 mm and a density of 3.37 g/cm$^3$. When broken, the fractures were found to extend through the diamond crystals, showing the strength of the diamond-silicon carbide bond. X-ray diffraction analyses of polished surfaces showed that the compact consisted of diamond and silicon carbide with minor silicon and graphite. The compact contained about 2% of silicon, 24% of silicon carbide and less than 1% of graphite by weight. By volume, the compact contained 71% of diamond.

The compact possessed generally similar mechanical and abrasive properties to the compact of Example 1. However, it was significantly tougher but slightly less wear resistant when used for single point turning of ultrahard material. The compact was found to perform excellently as a tool for grinding and drilling ultrahard materials.

A compact prepared similarly was mounted axially on a steel rod and inserted into a rotary grinder and rotated at 12,000 rpm. The rotating cylindrical surface of the compact was placed against the surfaces of rods of ultrahard and medium hard materials mounted in a lathe and rotated at 600 rpm. The compact proved very effective in removing stock by grinding from the surfaces of the workpieces and in producing smooth finishes. The results of a series of tests against different materials are given in Table 3. The compact could be sharpened and dressed when necessary by immersing it in molten potassium hydroxide at 600° C. for 2 minutes. This treatment etched the silicon carbide bond and removed worn diamond crystals from the surface.

When the diamond compact cylinder was rotated at 12,000 rpm and passed over the rough surfaces of a single crystal diamond, polished faceted surfaces were rapidly produced on the single crystal diamond. The results indicate that the diamond compact produced according to this Example may be practically useful in the shaping and polishing of gem diamonds and other precious stones.

Another compact similarly prepared was sliced into discs 3 mm thick by spark erosion. A disc was symmetrically fixed in a steel shaft with its axis parallel to the diameter of the disc so as to form a tipped drill. When mounted in a lathe and rotated at 12,000 rpm, the drill was found to readily penetrate ultrahard materials such as tungsten carbide, partially stabilized zirconia, alumina and quartzite. The time needed to drill a hole 11 mm in diameter and 2 cm deep into partially stabilized zirconia was 30 minutes. A similar hole was drilled in tungsten carbide in about one hour.

TABLE 3

Stock removal rates of a cylindrical compact prepared and opeated in a grinding mode against several ultrahard materials. The compact and test were performed as described in Example 9. Stock removed rates are averages for tests performed over intervals of 10 minutes.

| Material | Stock removal rate cm$^3$/minute |
| --- | --- |
| K68 tungsten carbide | 0.10 |
| Silicon carbide | 0.17 |
| Boron carbide | 0.05 |
| Partially stabilized zirconia | 0.4 |
| Sialon | 0.4 |
| Alumina | 1.4 |

EXAMPLE 10

A mixture comprising 85 percent of 40–60 micron diamond powder and 15 percent of 10–20 micron diamond powder was prepared. The mixture was further intimately mixed with 1–5 micron silicon powder in proportions by weight comprising 93 percent diamond to 7 percent of silicon. A diamond compact was then produced from this mixture using the same procedures as were used in Example 4. The diamond compact was recovered as an intact cylinder with a diameter of 6.5 mm, a height of 5 mm and a density of 3.39 g/cm³. It possessed similar abrasive properties to Example 1 and was found to contain 78 percent of diamond by volume. When broken, it was found to have been uniformly impregnated by silicon and possessed uniform hardness throughout.

EXAMPLE 11

As for Example 10 except that 96 percent by weight of the diamond mixture was intimately mixed with 4 percent of silicon powder. The resultant compact was similar in its external properties, abrasiveness and density to the compact of Example 10. It contained 81 percent of diamond by volume. However, when broken, it displayed dark patches in the interior which possessed a hackly surface and were substantially softer than the near-surface regions. Evidently, impregnation of silicon into the interior is less efficient when the proportion of silicon powder in the initial mixture falls below about 5 percent.

EXAMPLE 12

A mixture comprising 80 percent 40–60 micron powder and 20 percent of 20–40 micron diamond powder was prepared. The diamonds were then coated with vitreous silicon using a standard argon sputtering technique and a silicon target. The silicon coatings were approximately uniform in thickness and the total proportion of silicon present as coatings was 10.2 percent by mass of the entire mixture. The mixture ws subjected to high pressures and temperatures in the configuration and conditions as described in Example 4. The resultant compact was 4.3 mm long and 6.5 mm in diameter and possessed a density of 3.37 g/cm³. It displayed exceptionally high toughness and crushing strength.

EXAMPLE 13

As for Example 12 except that the diamonds in the diamond mixture were coated with films of silicon about 0.2 microns thick and the silicon powder pads adjoining the diamond mass were 1.3 mm thick. The resultant diamond compact was 4.1 mm long and had a density of 3.38 g/cm³. It possessed very high toughness and crushing strength. When fractured, it was found to have been uniformly impregnated by silicon and was uniformly hard throughout. This Example demonstrates that when diamonds are precoated with a thin film of silicon, the subsequent infiltration of silicon from the external pads is facilitated and the infiltration propogates further into the diamond mass than when a silicon coating is not present. The silicon films wet all the surfaces of diamond crystals and enhance the pervasive infiltration of external silicon.

EXAMPLE 14

As for Example 1 except that the silicon powder was replaced by an intimate mixture of silicon and titanium powders in the proportion 85 atomic percent of silicon to 15 atomic percent of titanium. Likewise, the silicon discs were replaced by layers of the same mixed powders, each approximately 1.5 mm thick. The titanium powder possessed a maximum particle size of 30 microns.

The compact was produced following the procedures described in Example 1. The electrical conductivity of this titanium-doped compact was about twice as high as that of the compact of Example 1. Moreover, it was found that the titanium-doped compact could be shaped by spark-machining (EDM) much more readily than the compact of Example 1. Its abrasive properties and strength were similar to those of Example 1.

EXAMPLE 15

As for Example 1 except that the silicon powder was replaced by an intimate mixture of silicon and rhenium powders in the proportion 90 atomic percent of silicon to 10 atomic percent of rhenium. Likewise the silicon discs were replaced by layers of the same mixed powders, each approximately 1.5 mm thick. The rhenium powder possessed a maximum particle size of 10 microns.

The compact was produced following the procedures described in Example 1. The resultant compact was found to possess wear coefficients against the ultrahard materials specified in Table 2 which were 30 to 50 percent higher than those of the most abrasive compacts hitherto produced according to the practice described in Example 1.

The claims defining the invention are as follows:

1. A process for producing a diamond compact consisting essentially of diamond crystals bonded by silicon carbide, said process comprising the steps of:
   (1) intimately mixing diamond crystals with silicon in the proportions of about 97 to 65 percent weight of diamond to about 3 to 35 percent by weight of silicon to produce an intimate mixture of the diamond crystals and silicon;
   (2) confining said intimate mixture of diamond crystals and silicon in a pressure vessel together with one or more bodies of silicon in contact with or immediately adjacent to said intimate mixture within the pressure vessel; and
   (3) subjecting said intimate mixture of diamond crystals and silicon and said one or more bodies of silicon within the pressure vessel to a temperature above the melting point of silicon in the range of about 1,100° to 1,800° C. and to pressure in the range of about 10 to 40 kilobars so as to cause melting of the silicon in said intimate mixture and melting of said one or more bodies of silicon and infiltration of silicon from said one or more bodies into the interstitial spaces between the diamond crystals and to cause most of the silicon between the diamond crystals to react with diamond to produce silicon carbide, said silicon carbide forming a bond between diamond crystals, the overall proportions of diamond and silicon being such as to produce a compact containing between about 50 and 85 volume percent of diamond with a density of at least 3.35 g/cm³ and a compressive strength of at least 10 kilobars.

2. A process as claimed in claim 1, wherein said intimate mixing in step 1 is performed by applying the silicon to be mixed to the surfaces of the diamond crystals in the form of coatings or films of silicon at least 0.2 microns thick.

3. A process as claimed in claim 1 or 2, wherein there is a pair of said bodies of silicon between which said intimate mixture of diamond crystals and silicon is placed within said pressure vessel before subjecting said intimate mixture of diamond crystals and silicon and said pair of bodies of silicon within the pressure vessel to said temperature above the melting point of silicon and said pressure in the range of about 10 to 40 kilobars.

4. A process as claimed in claim 1, wherein said temperature above the melting point of silicon and said pressure in the range of about 10 to 40 kilobars are maintained for a reaction time within the range of about 3 to 60 minutes.

5. A process as claimed in claim 4, wherein said temperature is in the range of about 1,400° to 1,600° C. and the reaction time is in the range of about 10 to 30 minutes.

6. A process as claimed in claim 4, wherein said temperature is in the range of about 1,250° to 1,400° C. and the reaction time is in the range of about 15 to 60 minutes.

7. A process as claimed in claim 1, wherein said intimate mixture of diamond crystals and silicon and said one or more bodies of silicon within the pressure vessel are subjected initially to an elevated temperature below the melting point of silicon and then subjected to elevated pressure to cause substantial plastic deformation of the diamond crystals and the temperature is subsequently raised to said temperature above the melting point of silicon to cause said infiltration of the silicon and the reaction of most of the silicon with diamond to form silicon carbide.

8. A process as claimed in claim 7, wherein the initial elevated temperature is in the range of about 800° to 1,200° C. and said temperature above the melting point of silicon is in the range of about 1,250° to 1,600° C.

9. A process as claimed in claim 1, wherein said intimate mixture of diamond crystals and silicon and said one or more bodies of silicon within the pressure vessel are subjected to said pressure in the range of about 10 to 40 kilobars before said contents are subjected to said temperature above the melting point of silicon so as to cause substantial plastic deformation of the diamond crystals before melting of the silicon in said mixture and said one or more bodies.

10. A process as claimed in claim 1, wherein the overall proportions of diamond and silicon are such that the compact has between 65 and 80 volume percent of diamond.

11. A process as claimed in claim 1, wherein the diamond crystals have a particle size in the range from 1 to 1,000 microns.

12. A process as claimed in claim 11, wherein the diamond crystals are in the range of sizes from 5 to 100 microns.

13. A process as claimed in claim 1, wherein a metallic addition consisting essentially of one or more metals selected from (a) elements which react with carbon to form stable carbides having melting points exceeding about 1600° C. and (b) elements which do not form carbides and do not melt at temperatures below 1600° C., is added to the diamond crystals and silicon before application of said temperature above the melting point of silicon and said pressure in the range of about 10 to 40 kilobars.

14. A process as claimed in claim 13, wherein the atomic proportion of metal to the total silicon content is between about 0.1 to 30 atomic percent.

15. A process as claimed in claim 14, wherein each metal of the addition is selected from the group consisting of titanium, zirconium, hafnium, niobium, tantalum, tungsten, molybdenum, vanadium, uranium, thorium, scandium, beryllium, rhenium, rhodium, ruthenium, iridium, osmium and platinum.

16. A process as claimed in claim 15, wherein the metallic addition is introduced in the form of a silicide, carbide or alloy.

17. A diamond compact consisting essentially of about 50 to 80 volume percent of diamond crystals bonded together by silicon carbide dispersed interstitially throughout the diamond crystals, said compact having a density of at least 3.35 g/cm$^3$, a porosity less than 3 percent by volume and a compressive strength of at least 10 kilobars, wherein said compact contains a substantial amount of diamond particles which are plastically deformed, said compact adapted to machine, cut, grind or drill ultrahard materials.

18. A compact as claimed in claim 17, wherein titanium is distributed throughout the compact in an amount such that the proportion of titanium to silicon is between about 0.1 and 30 atomic percent.

19. A compact as claimed in claim 18, wherein rhenium is distributed throughout the compact in an amount such that the proportion of rhenium to total silicon is between about 0.1 and 30 atomic percent.

* * * * *